United States Patent Office 2,848,457
Patented Aug. 19, 1958

2,848,457

THIOCYANOALKYLPYRIDINES AND THEIR PREPARATION

Wilhelm Mathes, Ludwigshafen (Rhine), and Anton Wolf, Heidelberg, Germany, assignors to Dr. F. Raschig G. m. b. H., Ludwigshafen (Rhine), Germany, a German limited-liability company No Drawing. Application July 11, 1956
Serial No. 597,061

12 Claims. (Cl. 260—294.8)

The present invention relates to thiocyanoalkylpyridines, their salts and procedure for preparing the same.

Thiocyanoalkaylpyridines have not heretofore been described. It has been found that thiocyanoalkylpyridines of the general formula

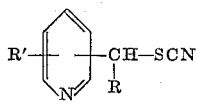

wherein R is hydrogen, alkylpyridine or thiocyanoalkylpyridine and R' is hydrogen or methyl, especially their salts, can be obtained when halogenoalkylpyridines of the general formula

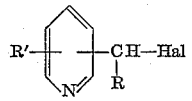

wherein R is hydrogen, alkylpyridine or halogenoalkylpyridine and R' is hydrogen or methyl, especially in the form of their salts, are reacted with inorganic salts of thiocyanic acid. Thus there is obtained, for example, the thiocyanic acid salts of thiocyanoalkylpyridines. As used herein, alkyl means lower alkyl such as methyl or ethyl and Hal means chlorine or bromine.

The free thiocyanoalkylpyridines are yellow to red-yellow oils, usually not distillatable and decomposing on standing. The new salts produced according to the present invention are on the other hand of unlimited stability. The foregoing process is also technically quite practicable. The thiocyanoalkylpyridines have bacteriostatic action as shown by the following table, concentrations being expressed in grams per cubic centimeter:

| Bacterium | 3-thiocyano-methyl-pyridine | 4-thiocyano-methyl-pyridine | 2-thiocyano-ethyl-pyridine | 4-thiocyano-ethyl-pyridine |
|---|---|---|---|---|
| Mycobacterium phlei | | 1:6,000 inhibited | 1:1,000 weakened | 1:2,000 inhibited; 1:6,000 weakened. |
| Staphylococcus aureus | 1:1,000 inhibited | 1:2,000 inhibited | 1:500 inhibited | 1:500 inhibited. |
| Bacterium coli | do | 1:1,000 inhibited | | Do. |

The invention is illustrated by the following non-limitative examples:

Example 1

16.4 grams of 3-chloromethylpyridine hydrochloride were dissolved in 50 cc. of methanol, mixed with 19.4 grams of potassium thiocyanate and heated on a water bath under reflux for a short time. The hot alcoholic solution was then separated from the precipitated potassium chloride and the thiocyanic acid salt of the 3-thiocyanomethylpyridine allowed to crystallize out by cooling. The yield was 17 grams. Purification was best carried out by recrystallization from alcohol. The colorless crystals had a melting point of 110° C. The 3-thiocyanomethylpyridine hydrochloride melted at 166–167° C. with decomposition.

Example 2

16.4 grams of 4-chloromethylpyridine hydrochloride, prepared from 4-hydroxy-methylpyridine and thionyl chloride, were dissolved in 50 cc. of methanol, mixed with 25.5 grams of barium thiocyanate and further treated and worked up as in Example 1. The thiocyanic acid salt of 4-thiocyanomethylpyridine crystallized out of the alcoholic filtrate in a yield of 15.6 grams as yellowish crystals. It was recrystallized from alcohol. The crystals then had a melting point of 120° C.

The 4-thiocyanomethylpyridine, freed with alkali from the thiocyanic acid salt, was a yellowish-red oil which decomposed upon vacuum distillation. The 4-thiocyanomethylpyridine hydrochloride melted at 149–150° C. with decomposition.

Example 3

25.3 grams of 2-bromomethylpyridine hydrobromide, prepared from 2-hydroxy-methylpyridine and thionyl bromide, were dissolved in 50 cc. of methanol and reacted with 19.4 grams of potassium thiocyanate. After further treatment and working according to Example 1, the thiocyanic acid salt of the 2-thiocyanomethylpyridine was obtained as light yellow crystals. The yield was 14.2 grams. The salt recrystallized from alcohol melted at 150° C. The 2-thiocyanomethylpyridine base, freed by alkali, passed over as a reddish-yellow oil between 139° and 140° C. under a vacuum of 4 mm. pressure, not wholly without decomposition. The hydrochloride had a melting point of 169°–170° C.

Example 4

17.9 grams of 6-methyl-2-chloromethylpyridine hydrochloride, prepared from 6-methyl-2-hydroxy-methylpyridine and thionyl chloride, were reacted with potassium thiocyanate and further treated according to Example 1. The thiocyanic acid salt of 6-methyl-2-thiocyanomethylpyridine was obtained as light yellowish crystals in a yield of 15.5 grams which, after recrystallization from alcohol, melted at 136° C.

Example 5

19 grams of 2-chloroethylpyridine hydrochloride, prepared from 2-hydroxy-ethylpyridine and thionyl chloride, were dissolved in 50 cc. methanol and then heated on a water bath for about one hour with 40 grams of potassium thiocyanate. The still hot solution was separated from precipitated potassium chloride, allowed to cool and the thiocyanic acid salt of 2-thiocyanoethylpyridine separated with ether from the alcoholic solution. The yield was 14 grams. The colorless crystals had a melting point of 208°–212° C. with decomposition.

Example 6

17 grams of 4-chloroethylpyridine hydrochloride, prepared from 4-hydroxy-ethylpyridine and thionyl chloride, were reacted with 35 grams of potassium thiocyanate and worked up according to Example 5, whereupon the thiocyanic acid salt of 4-thiocyanoethylpyridine precipitated as light yellowish crystals. The yield was 12.8 grams. The melting point was 149°–150° C.

*Example 7*

20 grams of di-(α-pyridyl)-1,2-dichloroethane dihydrochloride, prepared from di-(α-pyridyl)-1,2-dihydroxyethane and thionyl chloride, were dissolved in 50 cc. methanol, mixed with 27.4 grams of potassium thiocyanate and heated on a water bath under reflux for 1–2 hours. The precipitated potassium chloride was filtered out of the hot solution which was then allowed to cool. Thereupon, light yellowish crystals of the di-thiocyanic acid salt of di-(α-pyridyl)-1,2-dithiocyanoethane separated out which, upon recrystallization from alcohol, melted at 181°–182° C. The yield was 9 grams.

*Example 8*

10 grams of di-(γ-pyridyl)-1,2-dichloroethane dihydrochloride, prepared from di-(γ-pyridyl)-1,2-dihydroxyethane and thionyl chloride, were dissolved in 50 cc. of methanol and reacted with 13.5 grams of potassium thiocyanate by heating for 1–2 hours. The potassium chloride formed was separated from the hot alcoholic solution from which, upon cooling, the di-thiocyanic acid salt of di-(γ-pyridyl)-1,2-dithiocyanoethane crystallized out. After purification by again recrystallizing from methanol, it melted at about 180°–181° C. The yield was 7 grams.

The invention thus comprises new chemical compounds having bacteriostatic activity against various bacteria and procedure for preparing such compounds, particularly their salts. The invention is defined by the appended claims.

What is claimed is:

1. A compound selected from the group consisting of thiocyanoalkylpyridines and their salts, the said thiocyanoalkylpyridines having the general formula

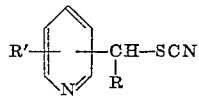

wherein R is selected from the group consisting of hydrogen, an alkyl pyridine and a thiocyanoalkylpyridine, alkyl meaning lower alkyl, and R' is selected from the group consisting of hydrogen and methyl.

2. The thiocyanic acid salt of 3-thiocyanomethylpyridine.

3. The thiocyanic acid salt of 4-thiocyanomethylpyridine.

4. The thiocyanic acid salt of 2-thiocyanomethylpyridine.

5. The thiocyanic acid salt of 4-thiocyanoethylpyridine.

6. The dithiocyanic acid salt of di-(γ-pyridyl)-1,2-dithiocyanoethane.

7. A process for the preparation of a thiocyanoalkylpyridine of the general formula

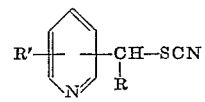

wherein R is selected from the group consisting of hydrogen, alkylpyridine and thiocyanoalkylpyridine, alkyl meaning lower alkyl, and R' is selected from the group consisting of hydrogen and methyl and its salts, which comprises heating of a halogenoalkylpyridine of the general formula

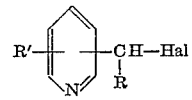

wherein R is selected from the group consisting of hydrogen, an alkylpyridine and a halogenoalkylpyridine, alkyl meaning lower alkyl, and R' is selected from the group consisting of hydrogen and methyl, with an inorganic salt of thiocyanic acid, and recovering the thiocyanoalkylpyridine thus produced.

8. The process which comprises heating an alcoholic solution of 3-chloromethylpyridine hydrochloride with potassium thiocyanate, removing the precipitated potassium chloride, and recovering the thiocyanic acid salt of 3-thiocyanomethylpyridine by crystallization.

9. The process which comprises heating an alcoholic solution of 4-chloromethylpyridine hydrochloride with barium thiocyanate, removing the precipitated barium chloride, and recovering the thiocyanic acid salt of 4-thiocyanomethylpyridine by crystallization.

10. The process which comprises heating an alcoholic solution of 2-bromomethylpyridine hydrobromide with potassium thiocyanate, removing the precipitated potassium bromide, and recovering the thiocyanic acid salt of 2-thiocyanomethylpyridine by crystallization.

11. The process which comprises heating an alcoholic solution of 4-chloroethylpyridine hydrochloride with potassium thiocyanate, removing the precipitated potassium chloride, and recovering the thiocyanic acid salt of 4-thiocyanoethylpyridine by crystallization.

12. The process which comprises heating an alcoholic solution of di-(γ-pyridyl)-1,2-dichloroethane dihydrochloride with potassium thiocyanate, removing the precipitated potassium chloride, and recovering the dithiocyanic acid salt of di-(γ-pyridyl)-1,2-dithiocyanoethane by crystallization.

References Cited in the file of this patent

UNITED STATES PATENTS

| | | |
|---|---|---|
| 2,462,433 | Searle | Feb. 22, 1949 |
| 2,734,903 | Leonard | Feb. 14, 1956 |

OTHER REFERENCES

Panouse: Chem. Abstracts, vol. 45, column 1589 (1951).